INVENTOR
JOHN M. WALLACE
BY Wheeler, Wheeler + Wheeler
ATTORNEYS

United States Patent Office 3,269,685
Patented August 30, 1966

3,269,685
LEVELING CONTROL FOR ELECTRICALLY OPERATING HYDRAULIC LEVELING MEANS
John M. Wallace, Kewaunee, Wis., assignor to Frank Hamachek Machine Company, Inc., Kewaunee, Wis., a corporation of Wisconsin
Filed May 28, 1965, Ser. No. 459,672
13 Claims. (Cl. 248—346)

This invention relates to a leveling control for electrically operating hydraulic leveling means.

The present application is directed to the control apparatus per se, regardless of any equipment in which it may be used. However, an illustration of equipment in which the device has been successfully tested is the combine apparatus shown in the application of Frank B. Hamachek III et al., Serial No. 287,137, filed June 11, 1963, for United States patent, bearing common ownership with this application.

The instant device comprises a gravity operated weight which, in the event of tilt, moves to one or another of two extreme positions. It is preferred for the purposes of this particular application that the weight be a ball rolling upon a track. As compared with a pendulum, this has the advantage that an appreciable interval of time is required for the ball to roll from one extreme position to the other. This allows for the possibility that if the displacement of the control equipment was merely temporary, the situation may rectify itself before the ball reaches the point at which the hydraulic leveling apparatus will be energized.

In the extreme position of the ball, it actuates a switch to energize the leveling apparatus which restores the ball race to the normally level position from which it has been displaced, with resulting rolling of the ball. The actuation may be mechanical or the switch may be a light-operated photocell type of switch or a proximity switch, neither of which offer any obstruction to ball movement and neither of which exert any bias tending to return the ball to switch-operating position.

In the preferred equipment, tracks at right angles to each other are used, but it is not essential that the tracks be at right angles as long as they have sufficient relative angularity so that the balls rolling thereon can control both longitudinal and lateral tilt. Each track has its own ball and its own switches and in each case the switches control mechanism for restoring level in the appropriate direction.

The extreme positions of the weight are preferably defined by stops which have limited resilient yielding movement. In the preferred embodiments, the stops are wooden blocks mounted on slightly resilient arms. The objective of the resilience is to make the action "live" rather than "dead." It is not desired that the ball shall dwell in its extreme position if it has reached that position as the result of some starting or stopping movement of the machine on which the device is mounted, or as the result of jiggling which may not necessarily be attributable to undesired level. If the level is in fact such that correction is desirable, the ball will remain in or return to the extreme position notwithstanding resilience in the stop. However, if the condition which brought the ball to the extreme position is simply temporary, the resilience of the stop will tend to urge the ball away from the extreme position before any appreciable change in level has occurred.

Figure 1:
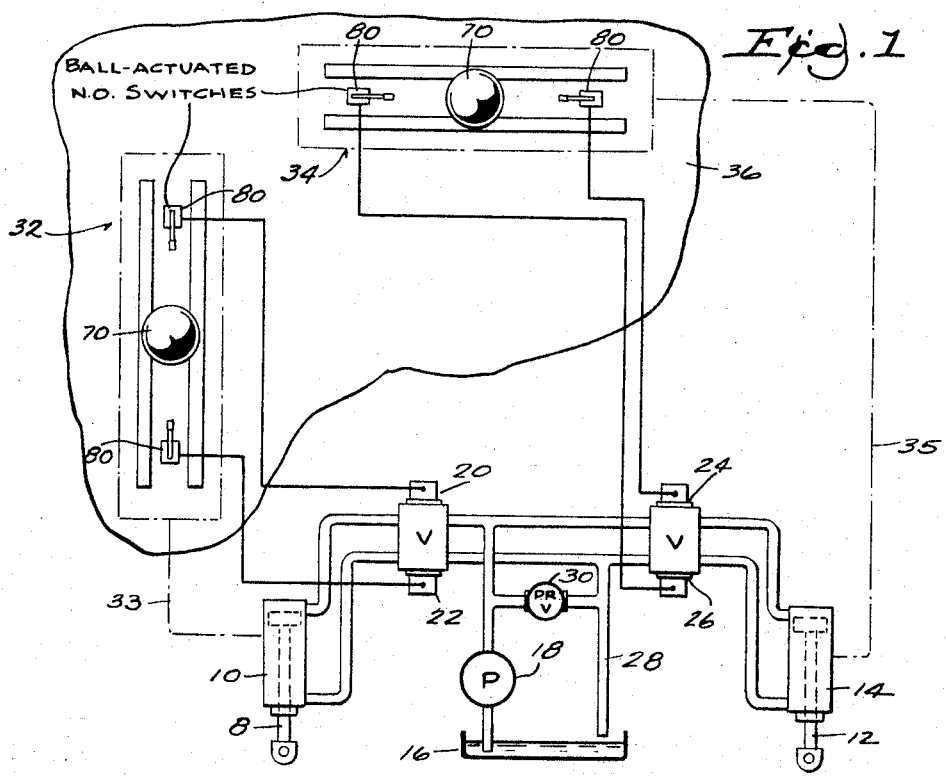
FIG. 1 is a simplified diagram of an installation embodying the invention.

The device to be controlled is not illustrated, it being understood that it may comprise any device which is mounted for tilting movement about two angularly related axes. The tilting movement about one axis can be controlled by the piston rod 8 of a double acting ram 10. Tilting movement about the other axis is controlled by the piston rod 12 of a double acting ram 14. The rams may be operated in the manner shown in the simplified diagram of FIG. 1. There is a source of hydraulic liquid shown at 16 from which the liquid may be supplied under pressure of pump 18 to the respective rams subject to the control of the solenoid valves 20 and 22 in the case of ram 10 and the solenoid valves 24 and 26 in the case of ram 14. The respective valves are designed and connected to permit return flow through the exhaust conduit 28 back to the source 16. Since this type of valve is conventional, the interior passages are not shown. The pump 18 may also have a pressure release valve 30 opening into the exhaust conduit 28.

Figure 5:
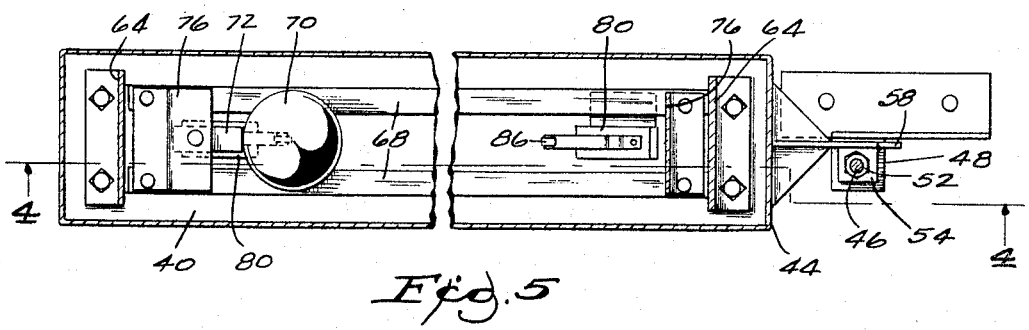
FIG. 5 is a view taken in section on the line 5—5 of FIG. 4.

Separate leveling control devices 32 and 34 control the valves for the respective rams 10 and 14 and are, in turn, re-leveled by the rams. As best appears in FIG. 1, control devices 32 and 34 are angularly related. They may be identical in their mechanical structure, the only difference being one of orientation. The preferred mechanical structure is shown in FIGS. 4, 5 and 6, but it will be understood that the mechanical switches illustrated may be replaced by the light-operated switch of FIG. 2 or the electrostatically operated switch of FIG. 3, for example.

Figure 4:
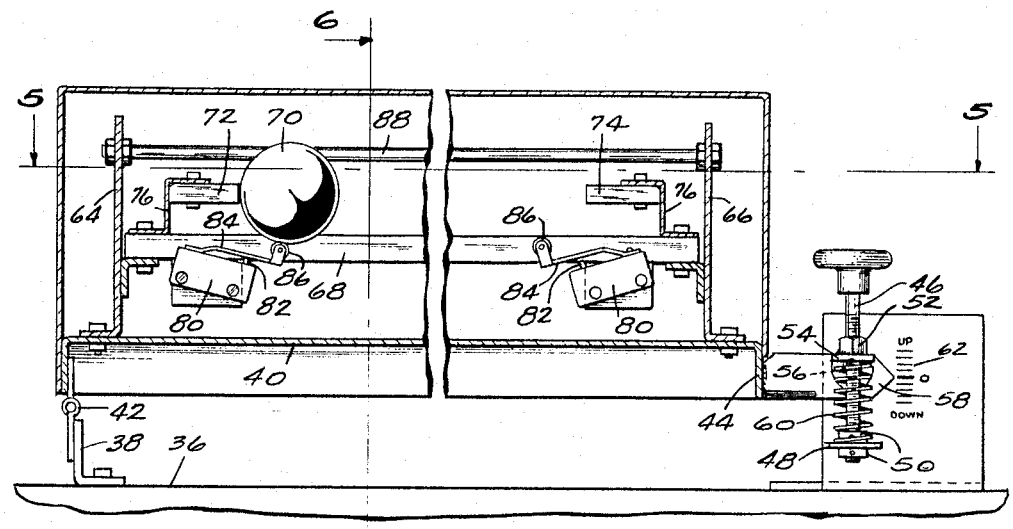
FIG. 4 is a view taken in longitudinal section on the line 4—4 of FIG. 5 and showing the structure of an actual device embodying the invention.
Figure 6:
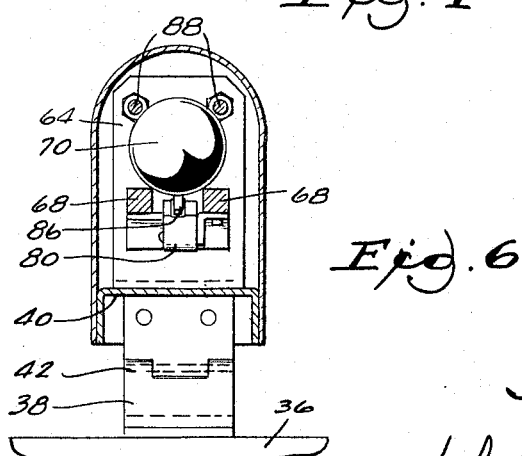
FIG. 6 is a view taken in transverse section on the line 6—6 of FIG. 4.

The base 36 shown in FIGS. 4 and 6 may be regarded as some part of the mechanism which is to be controlled as to its longitudinal and lateral tilt. The dotted line 33 in FIG. 1 indicates control of device 32 by piston 8 about one axis of tilt while dotted line 35 indicates control of device 34 about a transverse axis of tilt. The bracket 38 mounted on this base has a sub-frame 40 connected to it by means of a hinge at 42. The end 44 of the sub-frame may be adjusted with regard to the base by means of a hand screw 46 rotatable on bracket 48 and provided with thrust means 50 which may secure the screw against axial movement with respect to the bracket, while accommodating its rotative movement. In the course of rotation of the screw 46, it causes a nut 52 to move upwardly or downwardly along the screw. The nut is welded to a fitting 54 which is pivoted at 56 to a pointer 58 carried by the end 44 of the sub-frame. The spring 60 exerts a balancing bias upwardly on fitting 54 so there is a tendency to hold the adjustment in which the sub-frame is positioned by the screw. As a part of bracket 48, there is a scale 62 which cooperates with the pointer 58 to show the precise position of adjustment of the sub-frame.

The uprights 64 and 66 mounted on the sub-frame 40 carry spaced rails 68 upon which the ball 70 rolls between stops 72 and 74. The rails are normally parallel but if not the device is so adjusted that the ball moves on a horizontal path without opposition by gravity bias. The stops are not necessarily resilient per se but are resiliently yieldable to some extent. I have found it satisfactory to use stops carried on slightly resilient arms 76, 78 (FIG. 4). A slight degree of resilience is desirable in order that the ball 70 will not remain in either of its extreme positions unless there is a definite need for leveling action. In other words, if the ball arrives at one of the extreme positions and impacts its stop as the result of some temporary or casual situation unrelated to tilt, the ball will tend to rebound from the resilient stops before any substantial leveling operation has occurred.

In each of its extreme positions, the ball closes a switch. In the construction shown in FIGS. 4, 5 and 6, the switch 80 is a normally open switch having a push-button at 82 engaged by the lever 84 that carries at its free end a roller 86 disposed between the rails in a position such that when the ball engages roller 86 it will close its switch. Switch bias is light and therefore negligible resistance is offered to the movement of the ball 70. Moreover, the switch is so located that the ball does not roll across the roller but only moves into a position where it depresses the roller to close the switch substantially at the same instant that the ball strikes the stop 72 or 74, as the case may be. Consequently, there is no bias opposing free movement of the ball between its extreme positions, and whatever bias there is in the switch 80 supplements the bias of the resilient arm 76 as a means of tending to displace the ball from its switch-closing position, thus increasing the sensitivity of the device.

The ball may be prevented from dislodgement from its rails 68 by the overhead confining rods 88 (see FIGS. 4 and 6).

Figure 2:
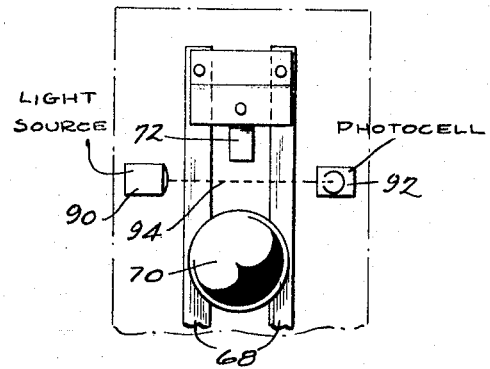
FIG. 2 is a fragmentary detail view showing a modification in which the ball intercepts a light beam to actuate the switch.
Figure 3:
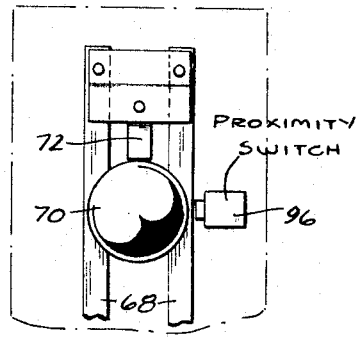
FIG. 3 is a view similar to FIG. 2 showing a further modified embodiment in which the ball operates a proximity switch.

As examples of other switches which may be substituted for the switch 80, see FIG. 2 and FIG. 3. FIG. 2 shows a light source 90 opposite a photocell 92. The light beam between the source and the photocell is shown diagrammatically by the dotted line 94 and it will be apparent that the movement of the ball 70 against the stop 72 will intercept the beam to effect, through a suitable relay and/or amplifier mechanism (not shown) the energization of the appropriate solenoid. Similarly, FIG. 3 shows a proximity switch 96 in a position where it will be energized as the ball 70 reaches the stop 72. It will be understood that the invention is not concerned with any particular type of switch. Neither is the invention concerned with the manner in which the respective switches control the respective solenoids. However, it is deemed important that the switch be independent of the ball. A free-rolling ball is very desirable and if the ball is used as a contact it may be corroded and even pitted with resultant loss of accuracy. As disclosed, the ball need not even be metallic. However, if made of metal, it will not be impaired by electrical action, since it does not conduct electricity in the prefered structure.

The present application is based on the fact that a moving weight, and particularly the ball rolling on normally perfectly horizontal tracks as herein disclosed, has specific advantages in a leveling device, this being especially true in the disclosed organization in which the ball path is normally horizontal and the leveling operation functions only when, and to the extent that, leveling is actually required. While a leveling device incorporating a pendulum could have some of the advantages herein disclosed, the ball is preferred because it is not subject to gravity bias in either direction of its normally horizontal path.

The pivotal adjustment of the sub-frame by means of screw 46 provides a convenient means of making each track normally horizontal for calibrating each device for effective use of its very accurate controlling function. Since the device as normally used includes one longitudinally disposed leveling device and one transversely disposed leveling device, either screw 46 may be used, if desired, to maintain a level in which the controlled apparatus is other than horizontal. As an example, if the leveling equipment is used on a pea threshing machine, it may establish a level to raise the rear end of the threshing cylinder to retard the flow of vines in a longitudinally disposed threshing cylinder. On the other hand, if the peas are mature, and therefore more easily threshed, the discharge end of the threshing cylinder can be carried in a lower position to permit greater ground speed and resulting increased threshing capacity. Similarly, if some portion of the apparatus disposed transversely should operate at a slight inclination toward one side or the other, the adjustment of the transverse leveling device will maintain a level which will result in the desired inclination of the portion in question.

I claim:

1. A control for a leveling device comprising the combination with a track providing a normally horizontal ball path, of a ball mounted to roll on the track and reciprocable upon said path, and ball-actuated switching means disposed at points spaced longitudinally of the track and to which the ball is movable by gravity without substantial opposing bias.

2. A control according to claim 1 in further combination with spaced stops in the path of the ball substantially at the points at which the switching means are respectively actuated by the ball, whereby the ball cannot move along the track in either direction substantially beyond the points at which it actuates one of such switching means.

3. A control according to claim 1 in which the stops include means resiliently yieldable upon engagement by the ball and adapted to react resiliently to initiate an opposite movement of the ball.

4. A control according to claim 3 in which each such stop comprises a block having a supporting arm somewhat yieldable in the direction of ball movement toward engagement with the respective stop.

5. A control according to claim 1 in which the switching means comprises a switch having a mechanical actuating lever with a portion in the path of movement of said ball.

6. A control according to claim 1 in which the switching means comprises a light source and a photoelectric cell, respectively spaced at opposite sides of the path of movement of the ball, the ball being adapted to interrupt the transmission of light from said source to said cell.

7. A control according to claim 1 in which the switching means comprises a proximity switch disposed adjacent the path of movement of the ball at one extreme position thereof upon said track.

8. A control according to claim 1 in which the track is mounted on a sub-frame and in further combination with a base subject to leveling, hinge means adjustably connecting the sub-frame with the base, and means for adjusting the sub-frame pivotally upon said hinge for rendering the path of ball movement normally horizontal.

9. A control comprising the combination of a pair of ball races each of which defines a normally horizontal path and each of which is subject to regulation of its path by an associated leveling device, the said races being angularly related to each other, balls mounted to roll along the respective races in directions which are angularly related to each other, each ball being freely gravity-operable without opposing bias in any direction to which its respective race tilts, means defining on each race ball positions which are mutually spaced longitudinally of the race and at which leveling action is to occur and switch means associated with each race in positions to be ball actuated when the ball reciprocable on said race reaches one of said positions.

10. A control according to claim 9 in which each race comprises a pair of spaced bars and means for confining the ball thereon, separate sub-frames upon which the bars of each pair are mounted, and means for adjusting the respective sub-frames individually to define horizontal paths of movement for the respective balls.

11. The combination with a base mounted for tilting adjustment in each of two transverse directions, and separate leveling means for effecting such adjustment, of a separate control for each said means, the respective controls being mounted on said base and comprising gravity-operable weights movable in directions transverse to each other, switch means disposed at predetermined extremes of movement of each such weight for actuation by a respective weight, and means actuated by each switch means for controlling a respective leveling means for operation in a level-restoring direction when a weight reaches one of said extremes of movement.

12. A combination according to claim 11 in which each weight comprises a ball and said base has ball races mounted substantially at right angles to each other and defining normally horizontal paths of movement for the respective balls across said base, the races offering substantially no gravity opposition to the movement of respective balls upon the respective races in a direction to which said base tilts.

13. A combination according to claim 11 in which the base has equipment mounted thereon which requires inclination from horizontal, the said leveling means being usable to establish a level at which said inclination is maintained.

References Cited by the Examiner
UNITED STATES PATENTS

| | | | |
|---|---|---|---|
| 683,213 | 9/1901 | Mansfield et al. | 247—252 |
| 977,523 | 12/1910 | Gustafson | 114—191 X |
| 1,049,713 | 1/1913 | Hensel | 244—78 |
| 1,316,313 | 9/1919 | MacGillivray | 116—114 |
| 1,866,596 | 7/1932 | Hendrickson | 244—77 X |
| 2,068,017 | 1/1937 | Given | 33—206 |
| 2,202,009 | 5/1940 | Knox et al. | 280—6.1 |
| 2,278,081 | 3/1942 | Kramer | 280—6.1 |
| 2,303,360 | 12/1942 | Irwin et al. | 33—205 |
| 2,908,472 | 10/1959 | McDonald | 248—346 |

CLAUDE A. LE ROY, *Primary Examiner.*